United States Patent [19]

Mastenbroek et al.

[11] Patent Number: 5,434,243
[45] Date of Patent: Jul. 18, 1995

[54] PROCESS FOR THE PREPARATION OF COPOLYMERS

[75] Inventors: Berend Mastenbroek; Philip J. M. M. de Smedt; Cornelis H. M. Tummers, all of Amsterdam, Netherlands

[73] Assignee: Shell Oil Company, Houston, Tex.

[21] Appl. No.: 248,998

[22] Filed: May 25, 1994

[30] Foreign Application Priority Data

May 25, 1993 [EP] European Pat. Off. ............ 93210498

[51] Int. Cl.$^6$ .............................................. C08G 67/02
[52] U.S. Cl. ................................... 528/392; 528/271
[58] Field of Search .............................. 528/271, 392

[56] References Cited

U.S. PATENT DOCUMENTS 5,010,170 4/1991 Rosenbrand et al. .
5,021,547 6/1991 Gautier et al. ..................... 528/392
5,147,840 9/1992 de Jong et al. .

FOREIGN PATENT DOCUMENTS

0490452A2 12/1991 European Pat. Off. .
0501576A2 2/1992 European Pat. Off. .

Primary Examiner—Shelley A. Dodson

[57] ABSTRACT

It is herein disclosed a process for the preparation of copolymers of carbon monoxide and one or more ethylenically unsaturated compounds by reacting the monomers under polymerization conditions in the presence of a catalyst system consisting essentially of:
  a) a source of cations of one or more metals of Group VIII of the Periodic Table;
  b) a bidentate ligand;
  c) a source of anions; and in the further presence of a diluent in which the copolymers are insoluble or virtually insoluble, and of an acid, wherein the molar ratio between the acid and the metal(s) of Group VIII, at least during the initial stage of the polymerization is at least 5:1. Copolymers prepared according to the inventive process have and exhibit improved bulk density, and shaped articles of manufacture can be manufactured by utilizing such copolymers.

16 Claims, No Drawings

PROCESS FOR THE PREPARATION OF COPOLYMERS

BACKGROUND OF THE INVENTION

The invention relates to a process for the preparation of copolymers of carbon monoxide and one or more ethylenically unsaturated compounds.

Linear copolymers of carbon monoxide with one or more ethylenically unsaturated compounds can be prepared by contacting the monomers at elevated temperature and pressure with a suitable catalyst, generally based on, inter alia, a Group VIII metal component, in the presence of a diluent in which the copolymers are insoluble or virtually insoluble. During the polymerization, the copolymers are obtained in the form of a suspension in the diluent.

In these copolymers the units originating from carbon monoxide and the units originating from the ethylenically unsaturated compound(s) occur in a substantially alternating arrangement.

The said copolymers have established utility in various outlets for thermoplastics. They may be processed by means of conventional techniques into films, sheets, plates, fibers and shaped articles such as containers for food and drinks and parts for the car industry.

A suitable preparation method, which is performed in batch operation, is described in EP-A-181014.

The batchwise preparation of the copolymers is generally carried out by introducing the catalyst into a reactor which contains the diluent and monomers and which is at the desired temperature and pressure. As the copolymerization proceeds the pressure drops, the concentration of the copolymers in the diluent increases and the viscosity of the suspension rises.

The reaction is discontinued when the viscosity of the suspension becomes very high, because of severe agglomeration of copolymer particles and continuing the process would create difficulties in view of poor heat transfer in the suspension and stirring problems.

A variant of batchwise copolymerization is the semi-batchwise operation whereby besides the temperature, the pressure is also kept constant by adding monomers to the reactor during the copolymerization.

One of the important properties of the copolymers in question is the bulk density. This plays an important role both in the preparation and in the treatment, storage, transport and processing of the copolymers to be used in any of the aforesaid applications. As far as copolymer preparation is concerned, the rule of thumb is that the maximum permissible suspension concentration, expressed in (kg copolymer/kg suspension)$\times 100$, is about one tenth of the bulk density expressed in $kg/m^3$. This means that in the preparation of a copolymer with a bulk density of 100 $kg/m^3$, the maximum suspension concentration is about 10%, whereas in the preparation of a copolymer with a bulk density of 200 $kg/m^3$, the maximum suspension concentration is about 20%.

A doubling of bulk density offers the possibility of preparing about twice the quantity of copolymer in the same reactor volume. During copolymer treatment such as filtering, washing and drying, the quantity of adhering liquid is largely determined by the copolymer bulk density. Thus it has been found that a copolymer with a bulk density of 100 $kg/m^3$ binds approximately 5 kg diluent or washing liquid per kg, whereas to a copolymer with a bulk density of 200 $kg/m^3$ considerably less liquid is bound. This is of great importance because of the quantity of liquid to be used in washing the copolymers and which has to be removed when the copolymers are dried. As far as transport and storage are concerned, the rule is that the higher the copolymers' bulk density, the more attractive the flow behavior they will have and the less space they will occupy. As regards the processing of the copolymers into shaped objects, it is often the case that copolymers with low bulk density cause problems in the processing apparatus. For copolymers with low bulk density, e.g. of below 200 $kg/m^3$, a compacting treatment, for example by extrusion, in order to make them suitable for further processing in the usual equipment for that purpose, could cause a problem. The higher the copolymers' bulk density, the easier the prior treatment of the material, particularly extrusion.

It will be clear from the above that the main interest is in a process whereby a relatively high suspension concentration is achieved and whereby copolymers having a high bulk density are produced.

However, a complication is formed by the above-mentioned agglomeration of copolymer particles, which may occur, before the suspension concentration has reached a value required for obtaining copolymers in an adequate yield.

An investigation of this phenomenon has revealed that the onset of severe agglomeration can be postponed by increasing the amount of catalyst used. However, when operating the process on a commercial scale, for economic reasons, the use of larger quantities of catalyst is undesirable.

It has further been proposed to prepare copolymers having a high bulk density by supplying 25 to 85% of the total amount of the catalyst composition at the outset of the reaction and the remaining part of the catalyst composition at a later stage in the process. However, at the obtainable suspension concentrations, the copolymer yields leave room for improvement.

SUMMARY OF THE INVENTION

Surprisingly, it has now been found that copolymers having a high bulk density are obtained in an adequate yield, whereby the problems inherent in agglomeration of copolymer particles are substantially avoided by performing the copolymerization process under such conditions that at least during the initial stage of the process an acid is present in a relatively high amount with respect to the Group VIII metal(s) in the catalyst.

The invention may be defined as relating to a process for the preparation of copolymers of carbon monoxide and one or more ethylenically unsaturated compounds by reacting the monomers under polymerization conditions in the presence of a catalyst system consisting essentially of:

a) a source of cations of one ore more metals of Group VIII of the Periodic Table;

b) a bidentate ligand, c) a source of anions, and in the further presence of a diluent in which the copolymers are insoluble or virtually insoluble, and of an acid, whereby the molar ratio between the said acid and the metal(s) of Group VIII, at least during the initial stage of the polymerization, is at least 5:1.

DETAILED DESCRIPTION OF THE INVENTION

In the present patent application the term "initial stage of the polymerization" is used to indicate the period required for establishing contact between the monomers and the catalyst. If only part of the catalyst is introduced at the outset of the reaction, the initial stage of the polymerization extends to the period required for establishing contact between the monomers and the catalyst introduced at the outset.

It is preferred to introduce substantially all of the catalyst at the outset of the reaction. In practice the initial stage of the polymerization usually extends to 1 to 15% of the total reaction period.

The molar ratio between the acid and the metal(s) of Group VIII, during the initial stage of the polymerization may be in the range of, for example 7:1 to 20:1: Preferably, the said molar ratio is at least 10:1. On the other hand, it has been observed that a lower molar ratio during the later stages of the polymerization is advantageous, e.g. a molar ratio of acid to Group VIII metals of at least 2:1.

In order to ensure that the molar ratio between the acid and the metal(s) of Group VIII, at least during the initial stage of the polymerization is sufficiently high, a large amount of acid is required, especially if the acid is introduced together with the catalyst into the reaction zone. Consequently, the molar ratio between the acid and the metal(s) of Group VIII during the later stages of the polymerization, will be relatively high as well and may in fact be higher than the molar ratio preferred for these later stages.

It is therefore preferred to supply the acid, or at least a major proportion of the acid to the reaction zone, before component (a) and/or component (b) of the catalyst system are supplied to that zone. This mode of operation will result in a high molar ratio between the acid and the metal(s) of Group VIII at the outset of the reaction, which ratio will decrease during the initial stage of the polymerization. The amount of acid is selected such that at the end of the initial stage—i.e. after establishing contact between the monomers and the catalyst—the said ratio will still be above 5:1.

The metals of Group VIII of the Periodic Table include the noble metals palladium, rhodium, osmium, ruthenium, iridium and platinum and the metals of the iron group consisting of iron, cobalt and nickel. Of these, palladium, nickel and cobalt are preferred. Palladium is particularly preferred.

As source of cations of one or more of these metals for convenience, a salt of the metal(s) selected is used. Suitable salts include salts of mineral acids such as sulfuric acid, nitric acid and phosphoric acid and sulfonic acids such as methane sulfonic acid, trifluoromethanesulfonic acid and para-toluenesulfonic acid. Other suitable salts include salts of carboxylic acids, such as acetic acid, trifluoroacetic acid, propionic acid and citric acid.

Furthermore, as a source of cations, use may be made of the metals in their elemental form, or in a zero-valent state thereof, e.g. in complex form. Usually these sources are applied together with a protic acid, so that the metal cations are formed in situ.

The catalyst system of the invention is based, as regards component (b), on a bidentate ligand, i.e. a stabilizing ligand containing two sites which can form a complexing bond with a metal of Group VIII.

Preferred bidentate ligands are bidentate diphosphines of the formula $$R^1R^2P-R-PR^3R^4 \tag{I}$$

wherein $R^1$, $R^2$, $R^3$ and $R^4$ independently represent hydrocarbyl groups or hydrocarbyl groups substituted with one or more polar groups, and R represents a bivalent bridging group containing at least two atoms in the bridge.

In the bidentate ligands of formula (I), R represents preferably a bivalent organic bridging group containing three atoms in the bridge, at least two of which are carbon atoms.

The optionally substituted hydrocarbyl groups $R^1$, $R^2$, $R^3$ and $R^4$ may be aryl, alkyl, alkaryl, aralkyl or cycloalkyl groups. Preferably they represent aryl groups and in particular aryl groups substituted by one or more polar groups such as alkoxy, alkylamino, dialkylamino groups or halogen atoms. Most preferred are phenyl groups wherein one or both ortho positions with respect to the phosphorus atom to which the aryl group is linked, are substituted with an alkoxy group containing from 1 to 4 carbon atoms in the alkyl group, preferably a methoxy group.

The source of anions (component c)) on which the catalyst system of the invention is based, is conveniently an acid or salt thereof. As suitable acids, the aforesaid acids participating in the Group VIII metal salts may be mentioned. Preferred anion sources are acids having a pKa value (measured at 18° C. in aqueous solution) of less than 4, particularly of less than 2. Preferred examples of anion sources are trifluoroacetic acid, p-toluenesulfonic acid, perchloric acid and tetrafluoroboric acid.

In preferred embodiments of the process the acid used for component (c) of the catalyst system is the same as the acid, present during the initial stage of the polymerization.

The amount of catalyst used in the process of the invention may vary considerably. Advantageously an amount is applied in the range of from about $10^{-7}$ to $10^{-1}$ gram atom of Group VIII metal(s) per mole of ethylenically unsaturated compound to be polymerized. Preferably the amount is in the range of from about $10^{-6}$ to $10^{-2}$ on the same basis.

The copolymers of the invention are insoluble or at least virtually insoluble in many conventional liquid solvents and accordingly a large number of these liquids may serve as diluent in the process of the invention.

Recommended diluents are polar organic liquids, such as ketones, ethers, esters or amides. Preferably a protic liquid such as monohydric or dihydric alcohols is used. Lower monohydric alcohols are the preferred diluents, e.g. methanol, ethanol and butanol-1. Methanol is particularly preferred.

Ethylenically unsaturated compounds, suitable to be used as starting material, include unsaturated compounds consisting exclusively of carbon and hydrogen and compounds comprising in addition one or more heteroatoms, such as oxygen or nitrogen atoms. Examples are unsaturated esters, such as methylacrylate and vinylacetate. Unsaturated hydrocarbons are, however, preferred. Suitable examples are the lower olefins, such as ethene, propene and 1-butene and cyclic olefins such as cyclopentene. Ethene and mixtures of ethene and propene are preferred starting materials.

The molar ratio between the monomer reactants, viz. on the one hand carbon monoxide and on the other hand the ethylenically unsaturated compound(s) is advantageously selected in the range of from 5:1 to 5:1, preferably in the range of from 1.5:1 to 1:1.5, with substantially equimolar amounts being most preferred.

Advantageously, the process of the invention is performed such that a solid material, in the form of a suspension in a suitable liquid, usually the reaction diluent, is present in the reaction zone, at the outset of the reaction. If desired, the suspension may also be added during the process, preferably during the initial stage thereof. Both organic and inorganic materials may be selected for this purpose. Preferably, a solid polymer material is used, particularly an alternating polymer of carbon monoxide with one or more ethylenically unsaturated compounds.

The concentration of the solid material in the diluent is not critical, but is usually in the range of from 1 to 10%.

The process of the invention is generally performed at temperatures in the range of from 30° to 150° C., preferably in the range of from 50° to 100° C. In many instances it has proved advantageous to increase the temperature during the polymerization reaction, e.g. by starting from a value of 3° C. below the desired final reaction temperature. The temperature increase may be effected gradually during the reaction or in one or more steps. Usually, a total temperature increase of from 2 to 5 degrees is most beneficial.

The reaction pressure is conveniently selected in the range of from about 10 to 120 bar, preferably in the range of from about 20 to 100 bar.

The invention will be illustrated with the following examples.

EXAMPLE I

A 150 L autoclave, equipped with a mechanical stirrer, operated at 560 rpm, was charged with a suspension of 1.25 kg of a solid, alternating terpolymer of carbon monoxide with ethene and propene in 50 L of methanol.

The air present in the autoclave was removed therefrom by pressurizing the autoclave with carbon monoxide to 15 bar and then releasing the pressure.

Propene was charged into the autoclave after which the contents of the autoclave were heated under stirring to 81° C. Ethene was fed up to a predetermined pressure, followed by addition of carbon monoxide to give a desired total reactor pressure of 46 bar. The carbon monoxide/olefins molar ratio was 0.42. Subsequently, 20 mmol of trifluoroacetic acid were supplied. Finally, a solution of 2 mmol of palladium (II) acetate and 2.1 mmol of 1,3-bis [di(2-methoxyphenyl)phosphino] propane in acetone was charged to the reactor, the addition time being about 30 minutes.

The reaction was continued for 10 hours, during which period the pressure was kept constant and the temperature was raised after 2 hours to 85° C. After 10 hours the contents of the autoclave were cooled to ambient temperature and the pressure was released. The final concentration of copolymers in the reaction mixture was 24.3%. The production rate was 19.3 kg per m³ reaction mixture and per hour. The bulk density of the product was 220 kg/m³.

EXAMPLE A (for comparison, not according to the invention)

The experiment of Example I was repeated, with the difference that trifluoroacetic acid (20 mmol) was not added before, but together with the other components of the catalyst system.

The reaction was discontinued after 7 hours. The production rate was 21.0 kg per m³ reaction mixture and per hour; the copolymer concentration was 17%. The bulk density of the product was 165 kg/m³.

While this invention has been described in detail for the purpose of illustration, it is not to be construed as limited thereby but is intended to cover all changes and modifications within the spirit and scope thereof.

We is claimed is:

1. In a process for the preparation of copolymers of carbon monoxide and one or more ethylenically unsaturated compounds by reacting the monomers under polymerization conditions in the presence of a catalyst system consisting essentially of:
   a) a source of cations of one or more metals of Group VIII of the Periodic Table:
   b) a bidentate ligand;
   c) an acidic source of anions; and
   d) a diluent in which the copolymers are insoluble or virtually insoluble; the improvement consisting of enhancing the bulk density of said copolymers by adding said acid component to said monomers before the addition of components a) and b) such that the molar ratio between said acid and said metal(s) during the initial stage of the polymerization is greater than or equal to 5:1.

2. A process as in claim 1 wherein said molar ratio is at least 10:1.

3. A process as in claim 1 wherein after the initial stage of polymerization, said molar ratio is at least 2:1.

4. A process as in claim 1 wherein component (a) of said catalyst system is a palladium cation.

5. A process as in claim 1 wherein component (b) of said catalyst system is a bidentate disphosphine of the formula:

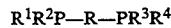

wherein $R^1$, $R^2$, $R^3$ and $R^4$ independently represent hydrocarbyl groups or hydrocarbyl groups substituted with one or more polar groups, and R represents a bivalent bridging group containing at least two atoms in the bridge.

6. A process as in claim 5 wherein in the diphosphine of formula (I) $R^1$, $R^2$, $R^3$ and $R^4$ independently represent aryl groups or aryl groups, in particular phenyl groups, substituted at one or both ortho-positions with respect to the phosphorus atom to which the aryl group is linked, with an alkoxy group containing from 1 to 4 carbon atoms in the alkyl group, and R represents a bivalent bridging group containing three atoms in the bridge, at least two of which are carbon atoms.

7. A process as in claim 1 wherein component (c) of said catalyst system is an acid having a pka of less than 2.

8. A process as in claim 1 wherein a major portion of component (c) of said catalyst system is introduced into the reaction zone prior to the introduction into said zone of the other components of the catalyst system.

9. A process as in claim 1 wherein said diluent is an organic protic liquid.

10. A process as in claim 1 wherein said ethylenically unsaturated compound is ethene, propene, or a mixture thereof.

11. A process as in claim 1 wherein in a reaction zone, during the initial stage of reaction, said diluent contains a suspension of an alternating polymer of carbon monoxide and one or more ethylenically unsaturated hydrocarbon.

12. A process as in claim 1 wherein the molar ratio between the carbon monoxide and the ethylenically unsaturated hydrocarbon compound is in the range of from 5:1 to 1:5.

13. A process as in claim 9 wherein said organic protic liquid is methanol.

14. A process as in claim 1 wherein said polymerization occurs at a temperature in the range of from 30° C. to 150° C., and at a pressure in the range of from 20 to 100 bars.

15. A copolymer prepared by the process of claim 1.

16. A shaped article prepared from the copolymer of claim 15.

* * * * *